(12) United States Patent
 Nozaki (10) Patent No.: US 11,007,893 B2
(45) Date of Patent: May 18, 2021

(54) CONTROL DEVICE FOR ELECTRIC VEHICLE AND ELECTRIC VEHICLE

(71) Applicant: SUBARU CORPORATION, Tokyo (JP)

(72) Inventor: Yuichiro Nozaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 618 days.

(21) Appl. No.: 15/792,516

(22) Filed: Oct. 24, 2017

(65) Prior Publication Data

US 2018/0208075 A1 Jul. 26, 2018

(30) Foreign Application Priority Data

Jan. 23, 2017 (JP) .............................. JP2017-009509

(51) Int. Cl.
 *B60L 58/12* (2019.01)
 *B60L 50/62* (2019.01)
 (Continued)

(52) U.S. Cl.
 CPC ............... *B60L 58/12* (2019.02); *B60L 15/20* (2013.01); *B60L 50/62* (2019.02); *B60L 58/40* (2019.02);
 (Continued)

(58) Field of Classification Search
 None
 See application file for complete search history.

(56) References Cited

U.S. PATENT DOCUMENTS 4,962,462 A * 10/1990 Fekete ................ H01M 16/006
 700/297
5,820,172 A * 10/1998 Brigham ................ B60K 6/485
 290/40 C
(Continued)

FOREIGN PATENT DOCUMENTS

JP   H 10-7533 A    3/1998
JP   2002-321681 A  11/2002
(Continued)

OTHER PUBLICATIONS

Japanese Office Action, dated Aug. 14, 2018, in Japanese Application No. 2017-009509 and English Translation thereof.

*Primary Examiner* — Navid Ziaeianmehdizadeh
(74) *Attorney, Agent, or Firm* — McGinn I.P. Law Group, PLLC.

(57) ABSTRACT

A control device for an electric vehicle equipped with a drive motor and a fuel cell includes a control output setter, a motor controller, and a fuel cell controller. The control output setter is configured to set a target value of an output of the drive motor based on a request command value. The motor controller is configured to control an output of the drive motor based on the target value using an electric power from a secondary battery as a power source. The fuel cell controller is configured to control the supply of a generated power by activating the fuel cell when the remaining capacity of the secondary battery decreases or an output of the secondary battery is insufficient. The control output setter decreases an allowable maximum value of the output of the drive motor when the remaining capacity can be decreased even after the fuel cell is activated.

12 Claims, 4 Drawing Sheets

(51) Int. Cl.
  *B60L 15/20* (2006.01)
  *B60L 58/40* (2019.01)
  *B60W 20/13* (2016.01)

(52) U.S. Cl.
  CPC .......... *B60W 20/13* (2016.01); *B60L 2240/12* (2013.01); *B60L 2240/14* (2013.01); *B60L 2240/423* (2013.01); *B60W 2510/244* (2013.01); *Y02T 10/70* (2013.01); *Y02T 10/7072* (2013.01); *Y02T 10/72* (2013.01)

(56) References Cited

U.S. PATENT DOCUMENTS

| | | | |
|---|---|---|---|
| 5,929,594 A | 7/1999 | Nonobe et al. | |
| 6,181,109 B1 * | 1/2001 | Maio | H02J 7/0022 320/150 |
| 6,326,765 B1 * | 12/2001 | Hughes | B60L 15/007 320/104 |
| 7,196,492 B2 * | 3/2007 | Sugiura | H01M 8/0494 320/101 |
| 10,358,050 B2 * | 7/2019 | Tomimoto | B60L 15/20 |
| 2010/0068575 A1 * | 3/2010 | Manabe | H01M 8/04111 429/422 |
| 2013/0157157 A1 * | 6/2013 | Skidmore | H01M 8/04298 429/428 |
| 2017/0166081 A1 * | 6/2017 | Kwon | B60L 58/32 |

FOREIGN PATENT DOCUMENTS

| | | |
|---|---|---|
| JP | 2009-165244 A | 7/2009 |
| JP | 2011-036101 A | 2/2011 |
| JP | 2014-143851 A | 8/2014 |

* cited by examiner

CONTROL DEVICE FOR ELECTRIC VEHICLE AND ELECTRIC VEHICLE

CROSS-REFERENCE TO RELATED APPLICATIONS

The present application claims priority from Japanese Patent Application No. 2017-009509 filed on Jan. 23, 2017, the entire contents of which are hereby incorporated by reference.

BACKGROUND

1. Technical Field

The present invention relates to a control device for an electric vehicle and the electric vehicle.

2. Related Art

Up to now, as disclosed in Japanese Patent Application Publication No. 2014-143851 (Patent Literature 1), in electric vehicles that travel with an output of a drive motor driven with the use of an electric power supplied from a secondary battery, there is an electric vehicle that allows a fuel cell to generate the electric power and enables the traveling to be continued while charging the secondary battery when the remaining capacity (SOC: state of charge) of the secondary battery drops. Such an electric vehicle is also referred to as a fuel cell range extender electric vehicle. In the fuel cell range extender electric vehicle, the secondary battery is charged by an external power supply, and the fuel cell is activated when the remaining capacity of the secondary battery drops while the electric vehicle is traveling. For that purpose, the fuel cell with a relatively small capacity is used as the fuel cell mounted on the fuel cell range extender electric vehicle.

However, in the fuel cell range extender electric vehicle, even when the fuel cell is operated at a maximum output for the purpose of charging the secondary battery whose remaining capacity has decreased, if a state in which a drive torque of the vehicle is large, such as overloading and continuous uphill is continued, a case in which the remaining capacity of the secondary battery continues to decrease is assumed. When the remaining capacity of the secondary battery continues to decrease, a power outage (hereinafter also referred to as "power shortage") state occurs, and the electric vehicle is in a travel disabled state. In the travel disabled state, a driver cannot resume driving until the secondary battery is charged to a preset capacity or more. On the other hand, if it is attempted to install a fuel cell providing a relatively large power generating capacity and having an output enabling traveling with only the fuel cell, a range extender electric vehicle is required to have a larger capacity of the fuel cell than necessary, and advantages of the range extender are impaired.

SUMMARY OF THE INVENTION

It is desirable to provide a novel and improved control device for an electric vehicle and a novel and improved electric vehicle which are capable of preventing a fuel cell range extender electric vehicle from falling into a power shortage state.

An aspect of the present invention provides a control device for an electric vehicle equipped with a drive motor and a fuel cell, the control device including: a control output setter that is configured to set a target value of an output of the drive motor on a basis of a request command value; a motor controller that is configured to control an output of the drive motor on a basis of the target value with the use of an electric power supplied from a secondary battery that is a power source of the drive motor; and a fuel cell controller that is configured to control the supply of a generated power by activating the fuel cell when the remaining capacity of the secondary battery decreases or when an output of the secondary battery is insufficient. The control output setter is configured to decrease an allowable maximum value of an output of the drive motor when the remaining capacity of the secondary battery is likely to be decreased even after the fuel cell is activated.

Another aspect of the present invention provides an electric vehicle including a drive motor, a secondary battery that is configured to supply an electric power to the drive motor, a fuel cell that is configured to generate the electric power to be supplied to the drive motor and the secondary battery, and a control device that is configured to control the electric vehicle, the control device including: a control output setter that is configured to set a target value of an output of the drive motor on a basis of a request command value; a motor controller that is configured to control an output of the drive motor on a basis of the target value with the use of an electric power supplied from a secondary battery that is a power source of the drive motor; and a fuel cell controller that is configured to control the supply of a generated power by activating the fuel cell when the remaining capacity of the secondary battery decreases or when an output of the secondary battery is insufficient. The control output setter is configured to decrease an allowable maximum value of an output of the drive motor when the remaining capacity of the secondary battery is likely to be decreased even after the fuel cell is activated.

DETAILED DESCRIPTION

A preferred example of the present invention will now be described in detail with reference to the accompanying drawings. In the present specification and the drawings, the same reference numerals are given to constituent elements having substantially the same functional configuration, and repeated explanations are omitted.

1. System Configuration of Electric Vehicle

Figure 1:
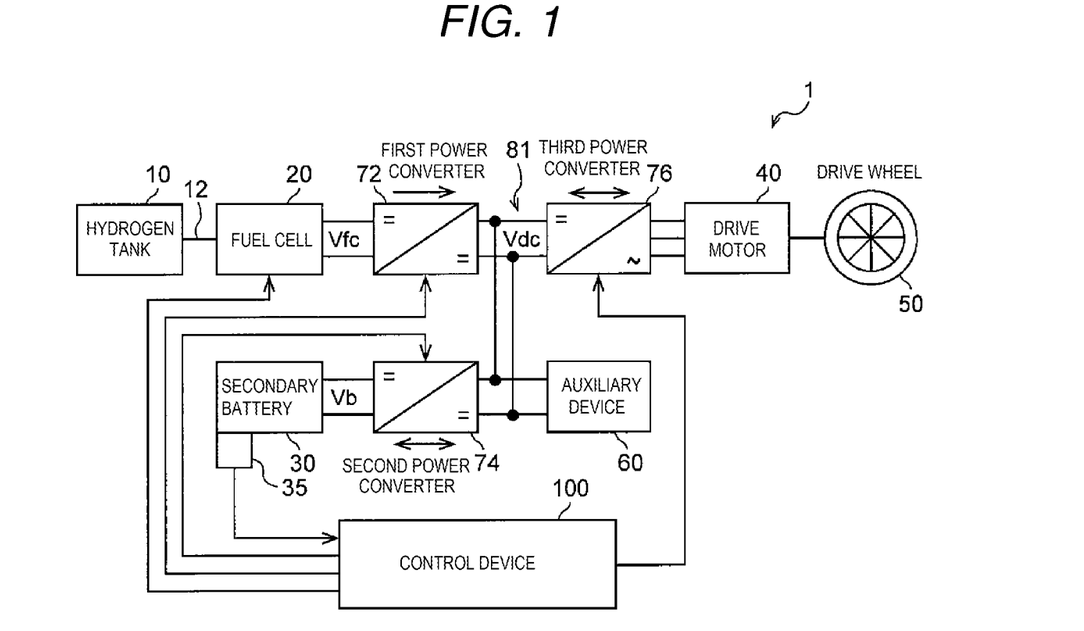
FIG. 1 is a block diagram illustrating a system configuration example of an electric vehicle according to an example of the present invention.

An example of a system configuration of an electric vehicle according to an example of the present invention will be described with reference to FIG. 1. FIG. 1 is a block diagram illustrating a system configuration example of a fuel cell range extender electric vehicle 1.

The electric vehicle 1 includes a hydrogen tank 10, a fuel cell 20, a secondary battery 30, a drive motor 40, drive wheels 50, and an auxiliary device 60. In addition, the electric vehicle 1 includes a first power converter 72, a second power converter 74, and a third power converter 76 as power converters. The fuel cell range extender electric vehicle 1 obtains a drive torque with the drive motor 40 driven with the use of an electric power supplied from the secondary battery 30 as a drive source. In addition, when the remaining capacity SOC of the secondary battery 30 decreases, the electric vehicle 1 activates the fuel cell 20 to generate an electric power, charges the secondary battery 30, and drives the drive motor 40, thereby being capable of continuing traveling.

The hydrogen tank 10 is charged with high-pressure hydrogen to be supplied to the fuel cell 20, for instance. The fuel cell 20 generates an electric power by reacting hydrogen gas with oxygen gas. The hydrogen tank 10 and the fuel cell 20 are coupled to each other through a pipe 12, and hydrogen gas is supplied from the hydrogen tank 10 to the fuel cell 20 by a motor pump not shown, or the like. In addition, air in the form of oxygen gas is supplied to the fuel cell 20 by a compressor not shown or the like. The supply amounts of hydrogen gas and oxygen gas are controlled by the control device 100 according to a voltage Vfc of the generated power (hereinafter also referred to as "fuel cell voltage") Vfc. The fuel cell 20 may be a known fuel cell 20 as long as the fuel cell has the above function. The fuel cell voltage Vfc corresponds to a first voltage in an example of the present invention.

The first power converter 72 converts a voltage (fuel cell voltage) Vfc of the generated power output from the fuel cell 20 into a predetermined DC stage voltage Vdc and supplies the predetermined DC stage voltage Vdc to an intermediate DC zone 81. The DC stage voltage Vdc corresponds to a second voltage in the example of the present invention. The generated power from the fuel cell 20 is supplied to the intermediate DC zone 81 as a DC power. The first power converter 72 is driven and controlled by the control device 100. The first power converter 72 is a so-called DCDC converter, and performs a unidirectional power conversion from the fuel cell 20 side to the intermediate DC zone 81 side, for instance. The first power converter 72 may be a known power converter as long as the power converter has the above function.

The secondary battery 30 is a power source of the drive motor 40 and stores an electric power to be supplied to the drive motor 40. Supply power of the secondary battery 30 can also be supplied to the auxiliary device 60. In addition, the secondary battery 30 can charge a generated power of the fuel cell 20 and a regeneratively generated power of the drive motor 40. Further, the secondary battery 30 can be coupled to an external power supply or an external charging device through a charging circuit and a connector not shown, and may have a function of being charged from an external power system. The secondary battery 30 is, for example, a battery capable of outputting an electric power with a voltage of 200 V, for instance. As the secondary battery 30, for instance, a lithium ion battery, a lithium ion polymer battery, a nickel hydrogen battery, a nickel cadmium battery, or a lead storage battery is used, but other secondary batteries may be used.

A battery management device (BMS: Battery Management System) 35 is provided in the secondary battery 30. In the present example, the battery management device 35 calculates information on an output voltage (hereinafter also referred to as "battery voltage") Vb and the remaining capacity SOC of the secondary battery 30, and outputs the calculated information to the control device 100. The battery voltage Vb corresponds to a third voltage in the example of the present invention.

The second power converter 74 converts the voltage (battery voltage) Vb of the DC power output from the secondary battery 30 into a DC stage voltage Vdc and supplies the DC stage voltage Vdc to the auxiliary device 60 and the intermediate DC zone 81. The electric power outputted from the secondary battery 30 is supplied to the auxiliary device 60 and the intermediate DC zone 81 while maintaining the DC power. Further, the second power converter 74 converts the voltage (DC stage voltage) Vdc of the generated power of the fuel cell 20 or the regeneratively generated power of the drive motor 40 to be supplied through the intermediate DC zone 81 into a predetermined charging voltage Vb_c, and charges the charging voltage Vb_c into the secondary battery 30. The generated power is supplied to the secondary battery 30 while maintaining the DC power as it is. For instance, in the case where the remaining capacity SOC of the secondary battery 30 is sufficient and the fuel cell 20 is not activated, the second power converter 74 charges the generated power during regenerative driving of the drive motor 40 into the secondary battery 30. When the remaining capacity SOC of the secondary battery 30 decreases and the fuel cell 20 is activated, the second power converter 74 charges the generated power of the fuel cell 20 into the secondary battery 30.

The second power converter 74 is driven and controlled by the control device 100. The second power converter 74 has a function as a so-called DCDC converter and performs a bidirectional power conversion from the secondary battery 30 side to the intermediate DC zone 81 side and from the intermediate DC zone 81 side to the secondary battery 30 side. The second power converter 74 may be a known power converter as long as the power converter has the above function.

The drive motor 40 is driven by the supplied electric power to output a torque for driving the drive wheels 50. The drive motor 40 is, for instance, a three-phase alternating current motor, and is driven (power running driven) with the use of the electric power supplied from the secondary battery 30 and the fuel cell 20 to generate a drive torque of the drive wheels 50. Further, the drive motor 40 has a function (regenerative function) as a generator that is regeneratively driven when the vehicle decelerates and generates an electric power with the use of a rotational torque of the drive wheels 50. The drive motor 40 may be a known drive motor 40 as long as the drive motor has the above function. In the example of the present invention, the drive motor 40 maybe a motor having no regenerative function.

The third power converter 76 converts the DC power supplied from the fuel cell 20 or the secondary battery 30 through the intermediate DC zone 81 into an AC power and supplies the AC power to the drive motor 40. The third power converter 76 converts the AC power regeneratively generated by the drive motor 40 into a DC power and supplies the DC power to the intermediate DC zone 81. The third power converter 76 is driven and controlled by the control device 100.

The number of the third power converters 76 coupled to the intermediate DC zone 81 is not limited to one, and multiple third power converters 76 may be coupled to the intermediate DC zone 81. In addition, the number of the drive motors 40 coupled to one third power converter 76 is not limited to one, and multiple drive motors 40 may be coupled to one third power converter 76.

Specifically, when the drive motor 40 is power-driven, the control device 100 controls the third power converter 76 to convert the DC power supplied through the intermediate DC zone 81 into an AC power, supplies the AC power to the drive motor 40, and drives the drive motor 40. Further, when the drive motor 40 is regeneratively driven, the control device 100 controls the third power converter 76 to convert the AC power generated by the drive motor 40 into a DC power, and supplies the DC power to the intermediate DC zone 81 as a charging power of the secondary battery 30. The third power converter 76 has a function as a so-called inverter and performs bidirectional power conversions from the intermediate DC zone 81 to the drive motor 40 and from the drive motor 40 to the intermediate DC zone 81. The third power converter 76 may be a known power converter as long as the power converter has the above function.

The auxiliary device 60 is components provided to the electric vehicle 1 such as various electric components, electronic equipment, air conditioning equipment and display equipment in the vehicle cabin. The auxiliary device 60 is driven with the electric power supplied from the secondary battery 30. The auxiliary device 60 is driven at a rated voltage of 20 V, for instance. In that case, in a current path to the auxiliary devices 60, a power converter not shown having a function of a step-down converter that steps down the DC power of the DC stage voltage Vb supplied from the second power converter 74, and supplies the stepped down DC power to the respective components may be provided.

2. Configuration of Control Device

Figure 2:
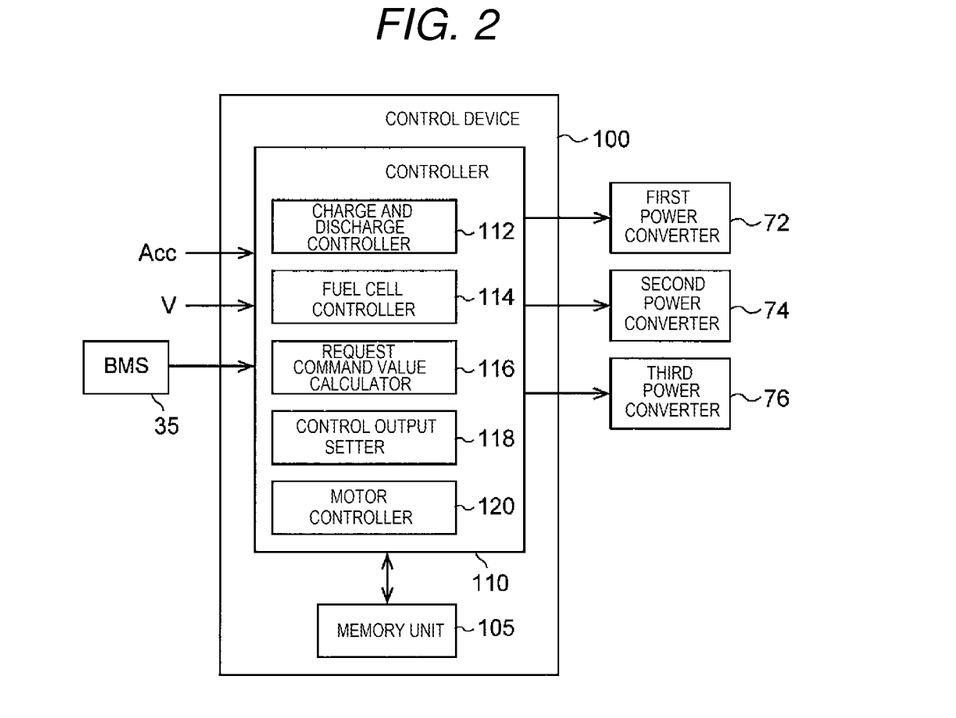
FIG. 2 is a block diagram illustrating a configuration example of a control device of the electric vehicle according to the example.

Next, a configuration example of the control device 100 of the electric vehicle 1 according to the present example will be described. FIG. 2 is a block diagram illustrating a configuration example of the control device 100. The control device 100 mainly includes a controller 110 mainly having a processor such as a CPU and a memory unit 105. Although the illustrated control device 100 is configured as a single control device, the control device 100 may be configured so that the multiple control devices can communicate with each other.

The controller 110 is provided with a charge and discharge controller 112, the fuel cell controller 114, a request command value calculator 116, a control output setter 118, and a motor controller 120. Each of those units is a function realized by executing a software program by a processor. The memory unit 105 also includes storage elements such as a RAM (Random Access Memory) and a ROM (Read Only Memory). For instance, the ROM stores the software program to be executed by the processor and information on various parameters used in the arithmetic processing. In addition, the RAM stores information such as sensor information acquired by the control device 100 and arithmetic processing result and the like.

The control device 100 receives information on an acceleration command value Acc of the electric vehicle 1, information on a vehicle speed V of the electric vehicle 1, and the like. The control device 100 may acquire those pieces of information from the sensor or the like electrically coupled to the control device 100, or may acquire those pieces of information from another control device through a communication means such as a CAN (Controller Area Network). The control device 100 also receives an output signal from the battery management device 35 provided in the secondary battery 30.

The charge and discharge controller 112 controls the driving of the second power converter 74 to control the charge and discharge of the secondary battery 30. For instance, during the power running drive of the drive motor 40, the charge and discharge controller 112 drives the second power converter 74 so as to convert the voltage (battery voltage) Vb of the power output from the secondary battery 30 into a DC stage voltage Vdc and supply the DC stage voltage Vdc to the intermediate DC zone 81. Further, during the regenerative driving of the drive motor 40, the charge and discharge controller 112 drives the second power converter 74 so as to convert the voltage (DC stage voltage) Vdc of the regeneratively generated power supplied through the intermediate DC zone 81 into a predetermined charging voltage Vb_c, and supply the charge voltage Vb_c to the secondary battery 30. After the fuel cell 20 has been activated, the charge and discharge controller 112 drives the second power converter 74 so as to convert the voltage (DC stage voltage) Vdc of the generated power of the fuel cell 20 supplied through the intermediate DC zone 81 into a predetermined charging voltage Vb_c and supply the charge voltage Vb_c to the secondary battery 30.

When the remaining capacity SOC of the secondary battery 30 decreases or when the output of the secondary battery 30 is insufficient, the fuel cell controller 114 activates the fuel cell 20 and controls the supply of generated power. For instance, the fuel cell controller 114 activates the fuel cell 20 when the remaining capacity SOC of the secondary battery 30 acquired from the battery management device 35 becomes less than a preset lower limit threshold value SOC_min (for example, 20%). Further, the fuel cell controller 114 activates the fuel cell 20 when the output of the secondary battery 30 is insufficient for the output of the drive motor 40. For instance, the fuel cell controller 114 may activate the fuel cell 20 when an output P (kW) of the drive motor 40 in a preset period or a predetermined period exceeds a maximum output Pb (kW) of the secondary battery 30. Alternatively, the fuel cell controller 114 may activate the fuel cell 20 when a state in which the output P of the drive motor 40 exceeds the maximum output Pb of the secondary battery 30 is continued for a predetermined time or more.

The fuel cell controller 114 controls the fuel cell 20 to cause the fuel cell 20 to generate an electric power with a predetermined output after the fuel cell 20 has been activated. Specifically, the fuel cell controller 114 controls the supply amounts of hydrogen gas and air to be supplied to the fuel cell 20, and causes the power generation at a predetermined output voltage (fuel cell voltage) Vfc. Further, the fuel cell controller 114 drives the first power converter 72 so as to convert the voltage (fuel cell voltage) Vfc of the generated power of the fuel cell 20 into the DC stage voltage Vdc and supply the DC stage voltage Vdc to the intermediate DC zone 81.

Further, after the fuel cell 20 has been activated, the fuel cell controller 114 stops the power generation by the fuel cell 20 when the remaining capacity SOC of the secondary battery 30 reaches a release threshold SOC_off (for instance, 40%) set in advance. The release threshold is set to a value larger than a lower limit threshold at which the fuel cell 20 is activated.

The motor controller 120 controls the output of the drive motor 40 based on a target value set by the control output setter 118 to be described later. Specifically, the motor controller 120 drives the third power converter 76 so that the output of the drive motor 40 becomes the target value when the drive motor 40 is power-driven. Further, when the drive motor 40 is regeneratively driven, the motor controller 120 drives the third power converter 76 so as to convert the regeneratively generated power (AC power) of the drive motor 40 into a DC power of the DC stage voltage Vdc.

The request command value calculator 116 calculates a request command value to the electric vehicle 1 based on the information on the acceleration command value Acc. For instance, the request command value calculator 116 may calculate the request command value with reference to a request command value map that defines a relationship between the acceleration command value Acc and the request command value stored in the memory unit 105 in advance. The request command value may be, for instance, a requested torque.

The control output setter 118 sets the target value for the output of the drive motor 40 based on the request command value calculated by the request command value calculator 116 and information on the vehicle speed V. When the fuel cell 20 is not activated, the control output setter 118 refers to, for instance, an output characteristic map stored in the memory unit 105 in advance, and sets the target value of the output within a range of the maximum output according to the basic performance of the drive motor 40. Further, in the case where the remaining capacity SOC of the secondary battery 30 can rise even if the output of the drive motor 40 is controlled according to the request command value after the fuel cell 20 has been activated, the control output controller 118 sets the target value of the output within the range of the maximum output according to the basic performance of the drive motor 40 with reference to the output characteristic map.

On the other hand, when the remaining capacity SOC of the secondary battery 30 can be decreased even after the fuel cell 20 has been activated, the control output setter 118 decreases the allowable maximum value of the output of the drive motor 40 and restricts the target value of output. As a result, the amount of electric power consumed by the drive motor 40 among the generated power generated by the fuel cell 20 is reduced, and the amount of electric power charged in the secondary battery 30 is increased. Therefore, the remaining capacity SOC of the secondary battery 30 is apt to rise early and the electric vehicle 1 is prevented from falling into an power shortage state while the residual capacity SOC of the secondary battery 30 keeps decreasing.

The control output setter 118 may directly monitor the remaining capacity SOC of the secondary battery 30, for instance, to determine whether the remaining capacity SOC can be decreased. Specifically, the control output setter 118 may calculate an average value (average remaining capacity) SOC_ave of the remaining capacity SOC in the predetermined time at every preset time or every predetermined time, and determine whether the remaining capacity SOC of the secondary battery 30 is decreased based on the transition of the average remaining capacity SOC_ave. At this time, when a value obtained by subtracting the average remaining capacity SOC_ave in the present period from the average remaining capacity SOC_ave in an immediately preceding period exceeds a preset threshold, the control output setter 118 may determine that the remaining capacity SOC may be decreased.

Further, the control output setter 118 may determine whether the remaining capacity SOC of the secondary battery 30 can be decreased even after the fuel cell 20 has been activated based on an average value (hereinafter also referred to as "average power running output") Pa (kW) of the output (kW) due to the power running drive of the drive motor 40, for instance, in a predetermined period Ti0 from the current to the past which is set in advance. Specifically, the control output setter 118 may determine that the remaining capacity SOC of the secondary battery 30 can be decreased when the average power running output Pa of the past predetermined period Ti0 exceeds a maximum output Pfc_max of the fuel cell 20. The control output setter 118 may compare the output P during the power running drive of the drive motor 40 at any time after activation of the fuel cell 20 with the maximum output Pfc_max of the fuel cell 20, but can determine that the remaining capacity SOC of the secondary battery 30 is decreased for a relatively long period with the use of the average power running output Pa.

Figure 3:
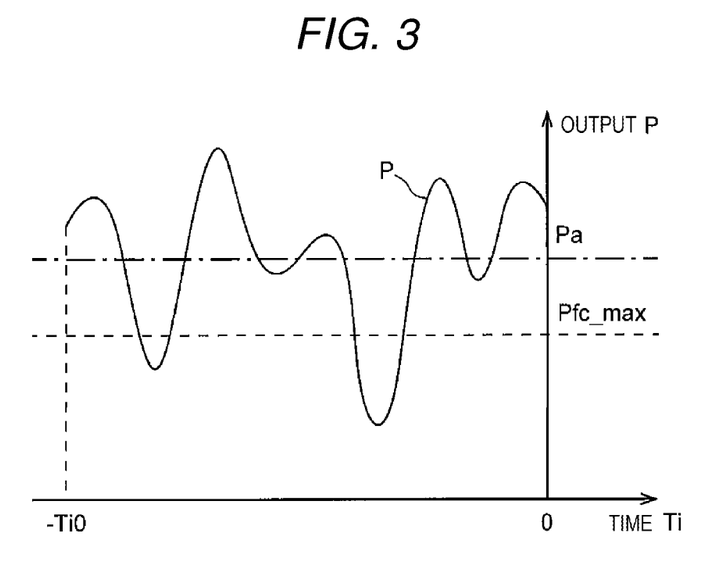
FIG. 3 is a diagram illustrating an average power running output of a drive motor.

FIG. 3 illustrates the average power running output Pa of the drive motor 40 and the maximum output Pfc_max of the fuel cell 20 in the past predetermined period Ti0. FIG. 3 illustrates a temporal change in the output P due to the power running drive of the drive motor 40 from the present time (Ti=0) to a time −Ti0 backward from the predetermined period Ti0. In this example, the average power running output Pa which is an average of the output P of the drive motor 40 exceeds the maximum output Pfc_max of the fuel cell 20. In that case, when the traveling state of the current electric vehicle 1 continues, the control output setter 118 determines that most of the generated power of the fuel cell 20 is consumed by the power running drive of the drive motor 40 and the remaining capacity SOC of the secondary battery 30 can be decreased. The average power running output Pa may include a power consumption by the auxiliary device 60. With the use of the average power running output Pa in the past predetermined period Ti0, the possibility of a decrease in the remaining capacity SOC of the secondary battery 30 can be estimated according to the traveling state of the current electric vehicle 1.

When determining that the remaining capacity SOC of the secondary battery 30 can be decreased, the control output setter 118 decreases the allowable maximum value of the output P of the drive motor 40. As a result, a total amount of the output P used for the power running drive of the drive motor 40 thereafter decreases, and the secondary battery 30 is charged with a surplus power excluding the power consumed by the drive motor 40 among the generated power of the fuel cell 20. For instance, the control output setter 118 reduces the average power running output Pa illustrated in FIG. 3 by decreasing the allowable maximum value of the output P of the drive motor 40, to thereby decrease the average power running output Pa illustrated in FIG. 3 so that the average power running output Pa falls below at least the maximum output Pfc max of the fuel cell. As a result, a decrease in remaining capacity SOC of the secondary battery 30 caused by traveling of the electric vehicle 1 thereafter is reduced, and the electric vehicle 1 is prevented from falling into a power shortage state.

In the example illustrated in FIG. 3, the allowable maximum value Px is set, for instance, by the following Expression (1).

$$Px = P0 \times Pfc\text{-}max / Pa \quad (1)$$

P0: maximum output in basic performance of drive motor
Pfc_max: maximum output of the fuel cell 20
Pa: average power running output in the past predetermined period As described above, the control output setter 118 may obtain the allowable maximum value Px including the power consumption by the auxiliary device 60 in the average power running output Pa in Expression (1).

Figure 4:
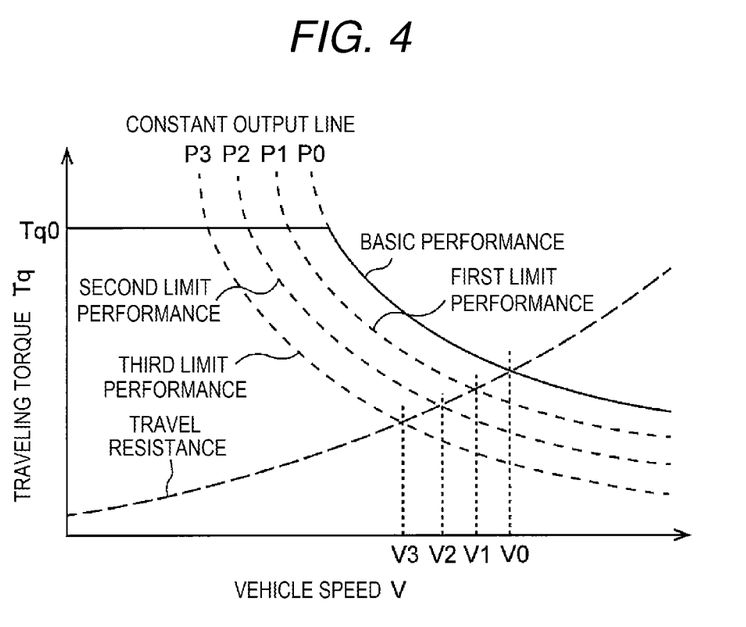
FIG. 4 is a diagram illustrating output characteristics of the drive motor.

On the other hand, in addition to the method of lowering the allowable maximum value based on the average power running output Pa and the maximum output Pfc_max of the fuel cell 20, the allowable maximum value may be lowered to a predetermined limit maximum output value set in advance. FIG. 4 is a diagram illustrating output characteristics of the drive motor 40. The axis of abscissa represents the vehicle speed V, and the axis of ordinate represents the traveling torque (traction force) Tq of the electric vehicle 1 due to the output of the drive motor 40. A solid line illustrates a maximum output characteristic according to the basic performance of the drive motor 40, and the drive motor 40 can output the traveling torque equal to or less than the maximum torque according to the vehicle speed V. According to the maximum output characteristic according to the basic performance, the maximum torque is kept to a constant value Tq0 in a region where the vehicle speed V of the electric vehicle 1 is equal to or less than a predetermined speed, and the output (horsepower) by the drive motor 40 increases with an increase of the vehicle speed V. In a region where the vehicle speed V of the electric vehicle 1 exceeds the predetermined vehicle speed, the maximum output of the drive motor 40 is kept constant at the basic maximum output P0, and the maximum torque decreases in inverse proportion to the vehicle speed V. Since the electric vehicle 1 is in a decelerating state in a region where a traveling resistance of the electric vehicle 1 generated according to the vehicle speed V of the electric vehicle 1 exceeds the traveling torque by the drive motor 40, the maximum vehicle speed when the drive motor 40 is driven at the maximum output according to the basic performance becomes the vehicle speed V0.

In addition, constant output lines of a first limit maximum output P1, a second limit maximum output P2, and a third limit maximum output P3 represent the maximum output characteristics when the allowable maximum value of the output of the drive motor 40 is reduced to perform the output limitation. The degree of limitation of the allowable maximum value of the output of the drive motor 40 is increased in the stated order of the first limit maximum output P1, the second limit maximum output P2, and the third limit maximum output P3. The maximum vehicle speeds V1, V2, and V3 in the case where the drive motor 40 is driven at the maximum output according to each limit performance become smaller as the degree of limitation of the allowable maximum value increases more. In this manner, with the decrease in the allowable maximum value of the output of the drive motor 40, the power consumption of the drive motor 40 caused by the travel of the electric vehicle 1 decreases. As a result, the charging of the secondary battery 30 due to the generated power of the fuel cell 20 is promoted.

The control output setter 118 may change the degree of limitation of the allowable maximum value of the output of the drive motor 40 based on, for instance, the acceleration command value Acc. For instance, when the acceleration command value is indicative of an accelerator opening degree, the control output setter 118 sets the allowable maximum value as the third limit maximum output P3 when the accelerator opening degree is 0 to 25%, sets the allowable maximum value as the second limit maximum output P2 when the accelerator opening degree is 25 to 50%, sets the allowable maximum value as the first limit maximum output P1 when the accelerator opening degree is 50 to 75%, and sets the allowable maximum value as the basic maximum output P0 when the accelerator opening degree is 75 to 100%. The allowable maximum value is set according to the accelerator opening degree, thereby preventing an unnecessary output from occurring from the drive motor 40, and being capable of reducing the power consumption of the drive motor 40.

Further, the control output setter 118 may change the degree of limitation of the allowable maximum value of the output of the drive motor 40 according to the decrease situation of the remaining capacity SOC of the secondary battery 30. For instance, the control output setter 118 temporarily decreases the allowable maximum value to the first limit maximum output P1 once in a situation in which the remaining capacity SOC of the secondary battery 30 may decrease after activation of the fuel cell 20. In the case where a situation in which the remaining capacity SOC of the secondary battery 30 may be still decreased is continued, the control output setter 118 decreases the allowable maximum value to the second limit maximum output P2. Further, in the case where the situation in which the remaining capacity SOC of the secondary battery 30 may be still decreased is continued, the control output setter 118 decreases the allowable maximum value to the third limit maximum output P3. The allowable maximum output is gradually decreased, to thereby prevent the traveling torque of the electric vehicle 1 from being reduced more than necessary.

Alternatively, the control output setter 118 may change the degree of limitation of the allowable maximum value of the output of the drive motor 40 according to the predicted degree of decrease of the remaining capacity SOC of the secondary battery 30. For instance, a threshold is set in three steps to a value AP obtained by subtracting the maximum power output Pfc_max of the fuel cell 20 from the average power running output Pa of the drive motor 40 illustrated in FIG. 3, and the limit maximum output whose degree of limitation is larger as the value AP increases more may be set.

In addition, one fixed value may be set as the limit maximum output when decreasing the allowable maximum value of the output of the drive motor 40. Specifically, for instance, only the third limit maximum output P3 in the output characteristic shown in FIG. 4 may be set. In this case, the control output setter 118 always sets the allowable maximum value of the output of the drive motor 40 to the third limit maximum output P3 in a situation where the remaining capacity SOC of the secondary battery 30 may decrease after activation of the fuel cell 20. The third limit maximum output P3 is a value set to a relatively large degree of limitation, and the power consumption by the drive motor 40 is reliably reduced, so that the charging power of the secondary battery 30 is easily secured. Therefore, the remaining capacity SOC of the secondary battery 30 can be increased at an early stage. The third limit maximum output P3 may be set to be an output characteristic balanced with the vehicle speed V3, for instance, by the travel resistance of the electric vehicle 1 on a flat road. Alternatively, the third limit maximum output P3 may be set to a value twice the maximum output Pfc_max of the fuel cell 20.

Figure 5:
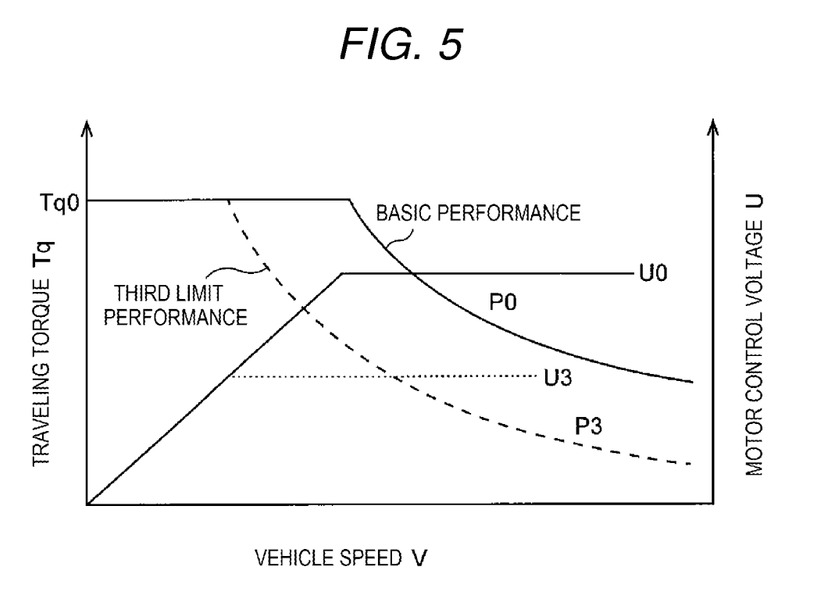
FIG. 5 is a diagram illustrating the output characteristics of the drive motor and a control voltage.

When the control output setter 118 lowers the allowable maximum value of the output of the drive motor 40, the charge and discharge controller 112 and the fuel cell controller 114 may lower the DC stage voltage Vdc of the intermediate DC zone 81. As a result, the maximum value of the motor control voltage that can be output by the third power converter 76 decreases. FIG. 5 illustrates an example in which the DC stage voltage Vdc is lowered with a decrease in the allowable maximum value of the output of the drive motor 40, and the maximum value of the motor control voltage U is lowered from U0 to U3. When the allowable maximum value of the output of the drive motor 40 decreases, the maximum value of the motor control voltage U output from the third power converter 76 may be a small value. Therefore, the DC stage voltage Vdc to be supplied to the third power converter 76 can also be reduced.

With the decrease in the DC stage voltage Vdc, a step-up ratio from the fuel cell voltage Vfc to the DC stage voltage Vdc in the first power converter 72 can be reduced. With a reduction in the DC stage voltage Vdc, a step-down ratio from the DC stage voltage Vdc to the charging voltage Vb_c during the charge control by the second power converter 74 can be reduced. In addition, the step-down ratio from the DC stage voltage Vdc to the motor control voltage U in the third power converter 76 can be reduced. Therefore, power losses generated in the first power converter 72, the second power converter 74, and the third power converter 76 are reduced, and the efficiency of each power converter can be improved.

In the case where the allowable maximum value of the output of the drive motor 40 is lowered, the control output setter 118 also releases the output limit of the drive motor 40 when the remaining capacity SOC of the secondary battery reaches the release threshold SOC_off and the power generation by the fuel cell 20 stops. As described above, the control output setter 118 limits the output of the drive motor 40 and lowers the power consumption by the drive motor 40 in a situation in which the remaining capacity SOC of the secondary battery 30 can be lowered even after the fuel cell 20 has been activated. As a result, priority is given to charging the secondary battery 30 by the generated power of the fuel cell 20, thereby being capable of preventing the electric vehicle 1 from falling into the power shortage state.

3. Method of Controlling Electric Vehicle

Figure 6:
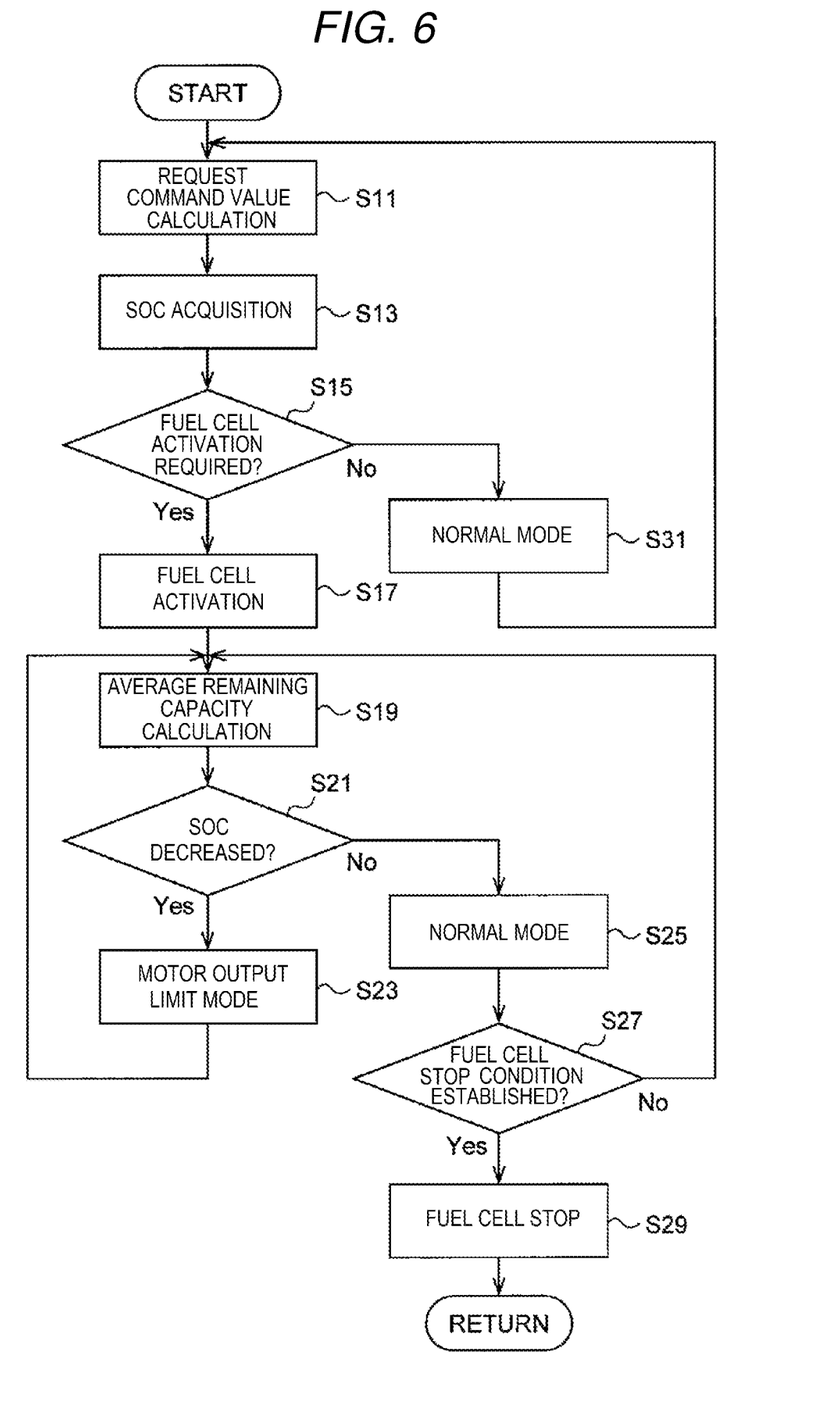
FIG. 6 is a flowchart illustrating a method of controlling the electric vehicle according to the example.

Next, an example of a flowchart of a control method of the electric vehicle 1 by the control device 100 according to the present example will be described with reference to FIG. 6. FIG. 6 is a flowchart illustrating a method of controlling the electric vehicle 1.

First, the request command value calculator 116 of the control device 100 calculates the request command value of the electric vehicle 1 (Step S11). For instance, the request command value calculator 116 calculates a request command value to the electric vehicle 1 based on the information on the acceleration command value Acc. For instance, the request command value calculator 116 may calculate the request command value with reference to a request command value map that defines a relationship between the acceleration command value Acc and the request command value.

Next, the fuel cell controller 114 of the control device 100 acquires information on the remaining capacity SOC of the secondary battery 30 (Step S13), and determines whether there is a need to start the fuel cell 20 (Step S15). When the remaining capacity SOC of the secondary battery 30 decreases or when the output of the secondary battery 30 is insufficient, the fuel cell controller 114 determines that there is a need to activate the fuel cell 20.

For instance, the fuel cell controller 114 may determine that there is a need to activate the fuel cell 20 when the remaining capacity SOC of the secondary battery 30 falls below the preset lower limit threshold SOC_min (for example, 20%). In addition, the fuel cell controller 114 may determine that there is a need to activate the fuel cell 20 when the output P (kW) of the drive motor 40 in the preset period or the predetermined period exceeds the maximum output Pb (kW) of the secondary battery 30. Alternatively, the fuel cell controller 114 may determine that there is a need to activate the fuel cell 20 when the state in which the output P of the drive motor 40 exceeds the maximum output Pb of the secondary battery 30 is continued for the predetermined time or more.

When there is no need to activate the fuel cell 20 (no in S15), the control device 100 controls the output of the drive motor 40 in a normal mode (Step S31). Specifically, in the normal mode, the control output setter 118 sets the target value of the output of the drive motor 40 (refer to FIG. 4) on the basis of the request command value and the vehicle speed V according to the output characteristic (refer to FIG. 4) based on the basic performance of the drive motor 40. The motor controller 120 controls the driving of the third power converter 76 based on the set target value, and causes the drive motor 40 to output a drive torque. Thereafter, the control device 100 returns to Step S11 and repeats the processing of the above steps.

On the other hand, when there is a need to activate the fuel cell 20 (yes in S15), the fuel cell controller 114 activates the fuel cell 20 to start the power generation (Step S17). Next, the control output setter 118 calculates the average remaining capacity SOC_ave in the predetermined period at every predetermined period set in advance (Step S19). Next, the control output setter 118 determines whether the remaining capacity SOC of the secondary battery 30 can be reduced even after the fuel cell 20 has been activated (Step S21). For instance, the control output setter 118 may determine whether the remaining capacity SOC of the secondary battery 30 has decreased based on the transition of the average remaining capacity SOC_ave. At this time, when a value obtained by subtracting the average remaining capacity SOC_ave in the present period from the average remaining capacity SOC_ave in an immediately preceding period exceeds a preset threshold, the control output setter 118 may determine that the remaining capacity SOC may be decreased.

Alternatively, instead of calculating the average remaining capacity SOC_ave in Step S19, the control output setter 118 may obtain the average power running output Pa of the drive motor 40 in the past predetermined period Ti0 from the current, and determine that the remaining capacity SOC may be decreased when the average power running output Pa exceeds the maximum output Pfc_max of the fuel cell 20 (refer to FIG. 3).

When the remaining capacity SOC of the secondary battery 30 maybe decreased (yes in S21), the control device 100 shifts the mode to a mode (hereinafter also referred to as "motor output limit mode") for limiting the output of the drive motor 40 (Step S23). In the motor output limit mode, the control output setter 118 lowers the allowable maximum value of the output of the drive motor 40 from the basic maximum output PO to the limit maximum output. For instance, the control output setter 118 may set the allowable maximum value Px with the use of the above Expression (1).

Alternatively, the control output setter 118 may set the allowable maximum value of the output of the drive motor 40 to the limit maximum output set with the multiple degrees of limitation in advance (see FIG. 4). In this case, the control output setter 118 may change the degree of limitation of the allowable maximum value based on the acceleration command value Acc, or may change the degree of limitation of the allowable maximum value according to the decrease situation of the remaining capacity SOC of the secondary battery 30. Further, the control output setter 118 may set the allowable maximum value to a fixed value set with a relatively large degree of limitation in advance.

The control output setter 118 sets the target value of the output of the drive motor 40 on the basis of the request command value and the vehicle speed V according to the output characteristic (refer to FIG. 4) in which the allowable maximum value of the output of the drive motor 40 has been decreased. The motor controller 120 controls the driving of the third power converter 76 based on the set target value, and causes the drive motor 40 to output a drive torque. The allowable maximum value of the output of the drive motor 40 is limited, thereby being capable of reducing the electric power consumed by the drive motor 40 among the generated power of the fuel cell 20, and increasing the electric power charged in the secondary battery 30. Therefore, the remaining capacity SOC of the secondary battery 30 can be likely to reach the release threshold SOC_off at an early stage, and the electric vehicle 1 is prevented from falling into the power shortage state.

In addition, in the motor output limit mode in Step S23, the charge and discharge controller 112 and the fuel cell controller 114 may decrease the maximum value of the motor control voltage U with the decrease in the allowable maximum value of the output of the drive motor 40. As a result, power losses generated in the first power converter 72, the second power converter 74, and the third power converter 76 are reduced, and the efficiency of each power converter can be improved. As a result, the charging efficiency of the secondary battery 30 can also be improved. After shifting to the motor output limit mode, the control device 100 returns to Step S19 and repeats the processing in each step described above.

On the other hand, when the remaining capacity SOC of the secondary battery 30 cannot be decreased in Step S21 (no in S21), the control device 100 controls the output of the drive motor 40 in the normal mode (Step S25). In the normal mode, the output of the drive motor 40 is controlled according to the contents described in Step S31 described above. Next, the fuel cell controller 114 determines whether the stop condition of the fuel cell 20 is satisfied (Step S27). For instance, the fuel cell controller 114 acquires the information on the remaining capacity SOC of the secondary battery 30, and when the remaining capacity SOC has reached the release threshold SOC_off, the fuel cell controller 114 may determine that the stop condition of the fuel cell 20 is satisfied. When the stop condition of the fuel cell 20 is not satisfied (no in S27), the control device 100 returns to Step S19 and repeats the processing in each step described above.

On the other hand, when the stop condition of the fuel cell 20 is satisfied (yes in S27), the fuel cell controller 114 stops the fuel cell 20 and terminates the power generation (Step S29). At this time, in the case of shifting to the motor output limit mode, the control device 100 releases the motor output limit mode. Thereafter, the control device 100 returns to Step S11 and repeats the processing in each step described above.

As described above, the control device 100 of the electric vehicle 1 according to the present example includes the control output setter 118 that decreases the allowable maximum value of the output of the drive motor 40 in the situation where the remaining capacity SOC of the secondary battery 30 may be decreased even after the fuel cell 20 has been activated because the remaining capacity SOC of the secondary battery 30 decreases or the output of the secondary battery 30 is insufficient. As a result, the amount of electric power consumed by the drive motor 40 among the generated power generated by the fuel cell 20 can be reduced, and the amount of electric power charged in the secondary battery 30 can be increased. Therefore, the remaining capacity SOC of the secondary battery 30 can be increased at an early stage, and the electric vehicle 1 can be prevented from falling into the power shortage state.

For instance, the control output setter 118 may set the allowable maximum value of the output of the drive motor 40 according to the acceleration command value of the electric vehicle 1. In this case, excessive output exceeding the output corresponding to the request command value can be prevented from occurring, and the power consumption of the drive motor 40 can be reduced.

Further, the control output setter 118 may decrease the allowable maximum value of the output of the drive motor 40 according to the decrease situation of the remaining capacity SOC of the secondary battery 30. In this case, the output of the drive motor 40 is prevented from being limited beyond necessity, and the influence on the traveling performance of the electric vehicle 1 can be reduced.

Although a preferred example of the present invention has been described in detail with reference to the accompanying drawings, the present invention is not limited to the example. Provided a person has ordinary knowledge in the technical field to which the example of the present invention pertains, within the scope of the technical idea described in the claims, the example of the present invention is intended to cover various changes or modifications, and such modifications are intended to fall within the technical scope of the present invention.

For instance, in the example described above, a description has been given of an automobile as the electric vehicle, but the present invention is not limited to this example. For instance, the electric vehicle maybe a railroad carrying a fuel cell or other transport machinery.

As has been described above, according to the present invention, the fuel cell range extender electric vehicle can be prevented from falling into the power shortage state.

The invention claimed is:

1. A control device for an electric vehicle equipped with a drive motor and a fuel cell, the control device comprising:
   a control output setter that is configured to set a target value of an output of the drive motor based on a request command value;
   a motor controller that is configured to control an output of the drive motor on a basis of the target value with the use of an electric power supplied from a secondary battery that is a power source of the drive motor; and
   a fuel cell controller that is configured to control the supply of a generated power by activating the fuel cell when the remaining capacity of the secondary battery decreases or when an output of the secondary battery is insufficient,
   wherein the control output setter is configured to decrease an allowable maximum value of an output of the drive motor when the remaining capacity of the secondary battery is likely to be decreased even after the fuel cell is activated,
   wherein the control output setter is configured to set the allowable maximum value on a basis of an average power running output of the drive motor in a past predetermined period and a maximum output of the fuel cell, and
   wherein the control output setter is configured to decrease the allowable maximum value to be an output characteristic of the drive motor balanced with the electric vehicle speed of the electric vehicle on a flat road when the remaining capacity of the secondary battery is likely to be decreased even after the fuel cell is activated.

2. The control device for the electric vehicle according to claim 1, wherein
the control output setter is configured to change the output characteristic of the drive motor to decrease the allowable maximum value when the remaining capacity of the secondary battery decreases even after the fuel cell is activated.

3. The control device for the electric vehicle according to claim 2, wherein the control output setter is configured to set the allowable maximum value according to an acceleration command value of the electric vehicle.

4. The control device for the electric vehicle according to claim 2, wherein the control output setter is configured to further decrease the allowable maximum value when the remaining capacity of the secondary battery decreases even after decreasing the allowable maximum value.

5. The control device for the electric vehicle according to claim 2, wherein the control output setter is configured to release a decrease of the allowable maximum value when the remaining capacity of the secondary battery reaches a predetermined value.

6. The control device for the electric vehicle according to claim 1, wherein the control output setter is configured to set the allowable maximum value according to an acceleration command value of the electric vehicle.

7. The control device for the electric vehicle according to claim 1, wherein the control output setter is configured to further decrease the allowable maximum value when the remaining capacity of the secondary battery decreases even after decreasing the allowable maximum value.

8. The control device for the electric vehicle according to claim 1, wherein the control output setter is configured to release a decrease of the allowable maximum value when the remaining capacity of the secondary battery reaches a predetermined value.

9. The control device for the electric vehicle according to claim 1, wherein
the fuel cell controller is configured to control driving of a first power converter that converts a first voltage of the generated power of the fuel cell to a second voltage,
the control device further comprises a charge and discharge controller that is configured to control a second power converter that converts a third voltage of an output power of the secondary battery into the second voltage, and
the fuel cell controller and the charge and discharge controller are configured to decrease the second voltage according to the decrease of the allowable maximum value.

10. The control device for the electric vehicle according to claim 1, wherein the electric vehicle comprises a fuel cell range extender electric vehicle.

11. An electric vehicle comprising a drive motor, a secondary battery that is configured to supply an electric power to the drive motor, a fuel cell that is configured to generate the electric power to be supplied to the drive motor and the secondary battery, and a control device that is configured to control the electric vehicle,
wherein the control device comprises:
a control output setter that is configured to set a target value of an output of the drive motor based on a request command value;
a motor controller that is configured to control an output of the drive motor on a basis of the target value with the use of an electric power supplied from the secondary battery that is a power source of the drive motor; and
a fuel cell controller that is configured to control the supply of a generated power by activating the fuel cell when the remaining capacity of the secondary battery decreases or when an output of the secondary battery is insufficient,
wherein the control output setter is configured to decrease an allowable maximum value of an output of the drive motor when the remaining capacity of the secondary battery is likely to be decreased even after the fuel cell is activated,
wherein the control output setter is configured to set the allowable maximum value on a basis of an average power running output of the drive motor in a past predetermined period and a maximum output of the fuel cell, and
wherein the control output setter is configured to decrease the allowable maximum value to be an output characteristic of the drive motor balanced with the electric vehicle speed of the electric vehicle on a flat road when the remaining capacity of the secondary battery is likely to be decreased even after the fuel cell is activated.

12. A control device fur a fuel cell range extender electric vehicle equipped with a drive motor and a fuel cell, the control device comprising:
a control output setter that is configured to set a target value of an output of the drive motor based on a request command value;
a motor controller that is configured to control an output of the drive motor on a basis of the target value with the use of an electric power supplied from a secondary battery that is a power source of the drive motor; and
a fuel cell controller that is configured to control the supply of a generated power by only activating the fuel cell when an output of the secondary battery is insufficient,
wherein the control output setter is configured to decrease an allowable maximum value of an output of the drive motor when the remaining capacity of the secondary battery is likely to be decreased even after the fuel cell is activated, and determine whether the remaining capacity of the secondary battery is likely to be decreased based on an average power running output of the drive motor in a past predetermined period and a maximum output of the fuel cell, and
wherein the control output setter is configured to decrease the allowable maximum value to be an output characteristic of the drive motor balanced with the electric vehicle speed of the electric vehicle on a flat road when the remaining capacity of the secondary battery is likely to be decreased even after the fuel cell is activated.

* * * * *